United States Patent

[11] 3,576,229

[72] Inventor Jerome G. Rivard
Birmingham, Mich.
[21] Appl. No. 792,243
[22] Filed Jan. 16, 1969
[45] Patented Apr. 27, 1971
[73] Assignee The Bendix Corporation

[54] FLUIDIC AUTOMOBILE STEERING SYSTEM WHICH AUTOMATICALLY COMPENSATES FOR WIND GUSTS AND THE LIKE
26 Claims, 5 Drawing Figs.

[52] U.S. Cl. .................................................. 180/79.2,
137/81.5
[51] Int. Cl. .................................................. B62d 5/08
[50] Field of Search.......................................... 180/79.2,
79.1; 244/78, 77 (M); 114/144, 150; 137/81.5

[56] References Cited
UNITED STATES PATENTS
2,579,711 12/1951 Staude............................ 91/375X

| 2,865,462 | 12/1958 | Milliken et al. ............... | 180/79.2 |
| 2,902,104 | 9/1959 | Schilling....................... | 180/79.2 |
| 2,904,120 | 9/1959 | Bidwell.......................... | 180/79.2 |
| 3,011,579 | 12/1951 | Milliken et al. ............... | 180/79.2 |
| 3,254,864 | 6/1966 | Kent et al. .................... | 244/78 |
| 3,456,752 | 7/1969 | Fonda ........................... | 180/79.2 |

Primary Examiner—Kenneth H. Betts
Assistant Examiner—John A. Pekar
Attorneys—William L. Anthony, Jr. and Plante, Arens, Smith & Thompson ABSTRACT: An automobile steering system having a fluidic rate sensor, a fluidic amplifier, and a closed loop fluid operated actuator to provide steering corrections to compensate for lateral disturbances such as wind gusts and road irregularities. The steering system of this invention further includes an apparatus responsive to the rate of change of driver commands for providing a signal to cancel rate sensor output signals due to course deviations induced by driver commands having high rates of change.

INVENTOR.
Jerome G. Rivard
BY
William J. Anthony
ATTORNEY.

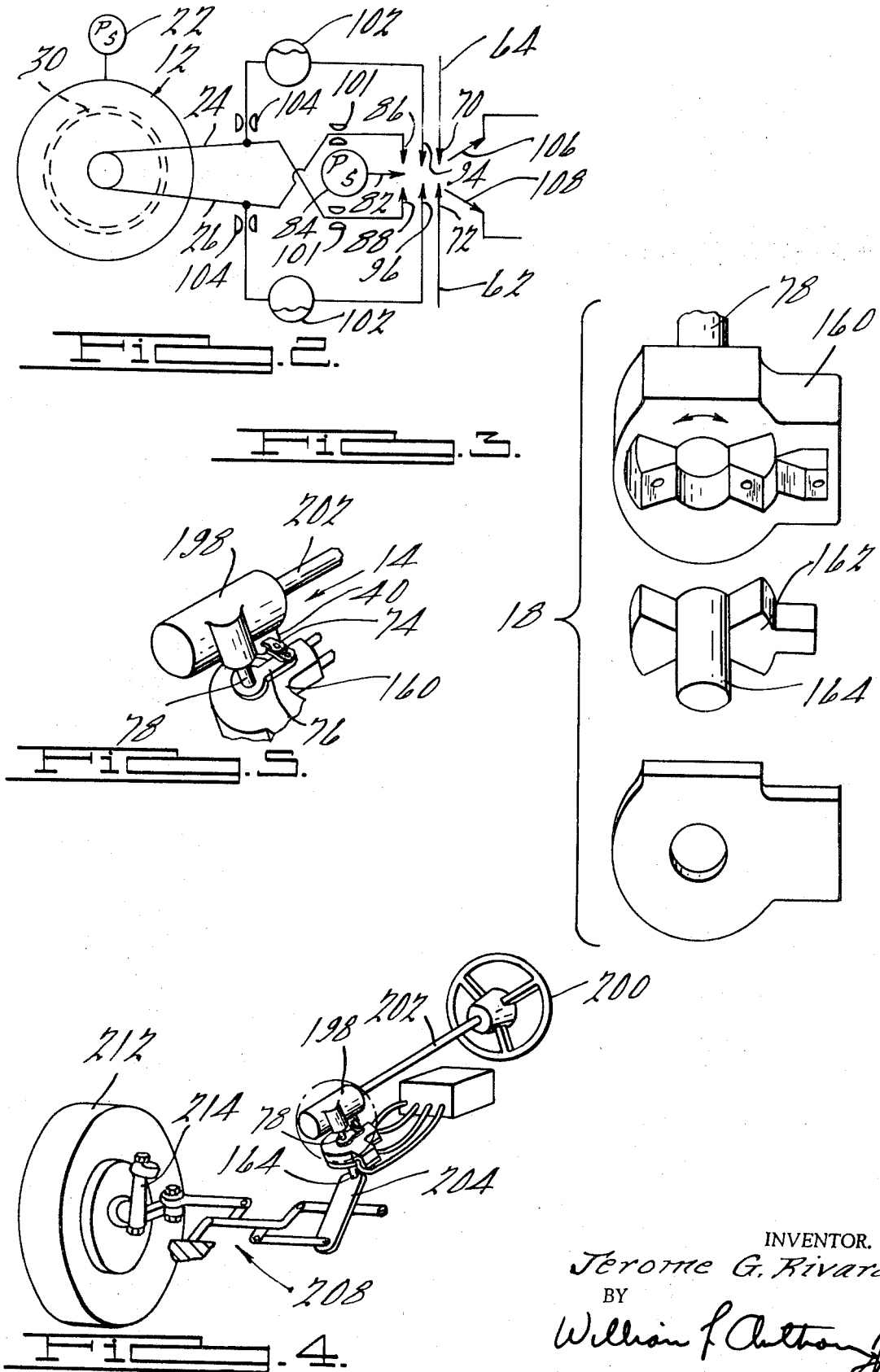

3,576,229

FLUIDIC AUTOMOBILE STEERING SYSTEM WHICH AUTOMATICALLY COMPENSATES FOR WIND GUSTS AND THE LIKE

CROSS REFERENCE TO RELATED APPLICATIONS

This application discloses an improvement over the device disclosed in the application of Lael B. Taplin and myself for "A Fluidic Automobile Steering System which Automatically Compensates for Wind Gusts and the Like," Ser. No. 792,904 filed Jan. 15, 1969.

BACKGROUND OF THE INVENTION

1. Field of the Invention

Steering systems for automobiles, and particularly, steering systems which automatically compensate for lateral disturbances.

2. Description of the Prior Art

Steering systems for automobiles using electrical components which automatically compensate for lateral disturbances such as wind gusts and road irregularities are known in the art. These prior art steering systems have proven to be deficient in that they do not effectively distinguish between course deviations of the vehicle due to driver-steering commands and course deviations of the vehicle due to lateral disturbances. Accordingly, prior art systems tend to provide steering corrections for course deviations due to driver-steering commands as well as those due to lateral disturbances. These steering corrections oppose and thereby nullify the driver-steering commands. It will be appreciated that this effect is undesirable.

SUMMARY OF THE INVENTION

The above-mentioned related application of Lael B. Taplin and myself discloses a fluidic automobile steering system with means for distinguishing between course deviations due to driver-steering commands and course deviations due to lateral disturbances in almost all instances. Particularly, it was found that lateral disturbances generally occur within a predetermined range of rates of change. Therefore, according to that invention, course deviations due to driver-steering commands are distinguished from course deviations due to lateral disturbances by providing means for cancelling signals from the sensor which represent rates of course deviations which are outside of the predetermined range. Accordingly, the system of the aforementioned invention is responsive only to course deviations within the range, and hence, the system primarily responds only to course deviations due to lateral disturbances.

In relatively infrequent instances, a driver-steering command may occur having a rate of change which is within the aforesaid predetermined range of rates of change. The present invention provides means for distinguishing between course deviations due to driver commands within the aforesaid range and course deviations due to lateral disturbances which are also within this range. This is accomplished by providing an apparatus responsive to driver-steering commands which generates a signal representative of rates of change of driver-steering commands within the predetermined range which is summed with the rate sensor output to cancel rate sensor outputs representative of course deviations due to the driver-steering commands which are within the range of rates of change of lateral disturbances, i.e., the range of response of the lateral disturbance compensating system. Accordingly, the system of this invention will not respond to driver induced course deviations even if the deviations have rates of change of the same order as those caused by lateral disturbances.

For example, consider the operation of the system of the above-referenced application wherein the compensating system is adjusted such that it only responds to course deviations above a predetermined rate. It will be appreciated that if a driver-induced course deviation occurs above the predetermined rate, the course deviation will be nullified by the system of that application since it is within the system's response range. Considering now the operation of the apparatus of the present invention, it will be appreciated that a signal will be generated by that apparatus in response to the exampled driver-steering command which will cancel the rate sensor output caused by the driver-steering command. Accordingly, no signal will be sent to the remainder of the system, and therefore, it will not respond to, and thus not nullify, the exampled driver-steering command.

According to this invention, a piston and cylinder combination is provided having the piston connected to the driver input means for movement in response thereto. The piston is provided with a bleed orifice such that the pressure in the cylinder rises only in response to movements of the driver input means at rates which result in driver-induced course deviations having rates of change within the range of response of the automatic steering system. The cylinder pressure is transmitted to the rate sensor either directly or downstream thereof to cancel rate sensor output signals which represent course deviations due to the driver-steering commands having rates of change within the response range of the automatic compensating system.

In view of the above, it will be appreciated that the signal generating apparatus of this invention is most advantageously combined with a system having means for limiting the response of an automatic lateral disturbance compensating system to vehicle course deviations having high rates of change. Through this combination, driver-induced course deviations are not nullified by the system, whether they are of the normal order (i.e., deviations of low rate which are not nullified since they are outside of the response range of the system), or of the less usual, higher rate order (i.e. within the response range of the system but which are also not nullified since they are within the range of the signal generating system). In this regard, a high-frequency response cutoff of the rate sensor output is not required since all high rate driver-induced turns are accounted for by the signal-generating system of this invention.

Importantly, the system disclosed herein is ideally suited for incorporation in a fluidic automatic compensating system. Hence, an automatic compensating system incorporating the present invention may be constructed which utilizes inexpensive and reliable fluidic components.

BRIEF DESCRIPTION OF THE DRAWINGS

FIG. 2 is a schematic illustration of a modification of a portion of the system of FIG. 1.

FIG. 3 is an exploded perspective view of a limited authority rotary actuator and summer incorporated in the system of FIG. 1.

FIG. 4 is a perspective view of an automobile steering system incorporating the lateral disturbance compensating system of FIG. 1.

FIG. 5 is a detailed view of a portion of the steering system of FIG. 4.

DETAILED DESCRIPTION OF THE PREFERRED EMBODIMENT

Figure 1:
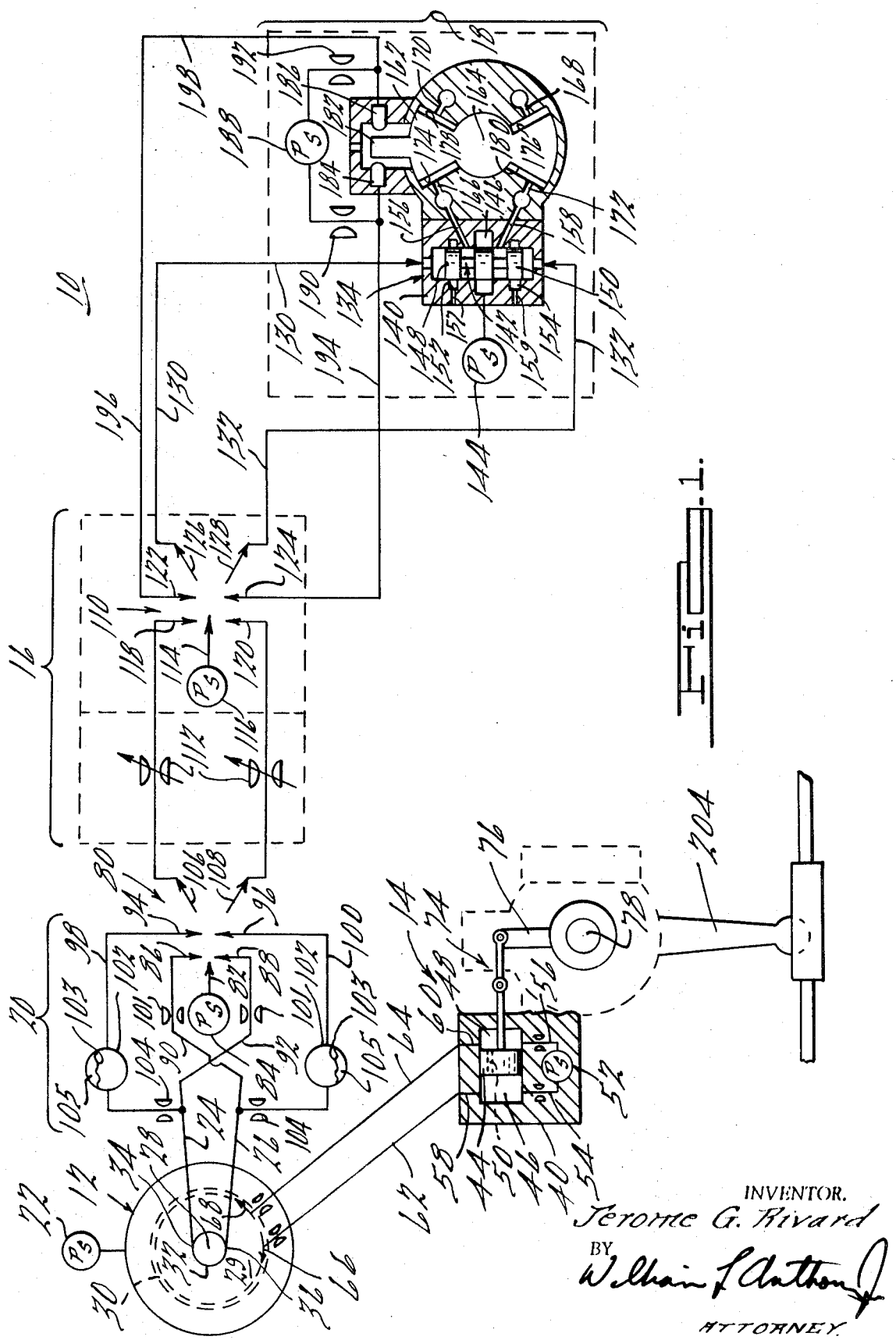
FIG. 1 is a schematic illustration of fluidic system according to this invention for an automobile steering system which automatically compensates for vehicle lateral disturbances.

In FIG. 1, a system 10 is shown for automatically compensating for vehicle lateral disturbances. The system 10 includes a course deviation sensor 12, a system 14 for generating a signal in response to high rates of driver commands for opposing those signals of the sensor 12 created by the high driver command rate, an amplifying circuit 16, and an actuator 18. In the preferred embodiment, the automatic lateral disturbance compensating system 10 includes a circuit 20 for limiting the response of the system 10 to course deviations having rates of change above a predetermined rate of change.

The course deviation sensor 12 may be a vortex rate sensor which receives pressurized fluid from a source 22, and upon lateral course deviations of a vehicle, will generate a differential pressure between lines 24 and 26 which is representative of the direction and amount of angular velocity of the vortex rate sensor 12 about its axis 28. Vortex devices of this nature are well known in the art and are illustrated in U.S. Pat. No. 3,351,080, and application, Ser. No. 547,595, assigned to the assignee of this invention. For one example, the rate sensor 12 may have a vortex chamber 29 including a porous element 30 through which supply fluid passes to an axial outlet opening 32. Rotational motion of the vortex rate sensor 12, produced by a course deviation of the vehicle, is imparted to the supply fluid by the porous element 30 thereby causing vortical flow in the device which may be measured at the outlet opening 32. One device for measuring vortical flow at the outlet opening consists of a pair of tangentially oriented pickoff tubes 34 and 36 positioned near the outlet opening 32, each of the tubes receiving a portion of the vortical flow. It can be seen from FIG. 1 that a rotational flow in the clockwise direction will cause a pressure rise at pickoff 34 and a pressure drop through aspiration at pickoff 36. Consequently, a pressure differential is created between lines 24 and 26 with the higher pressure being in line 24. It can also be seen that a counterclockwise flow will cause a pressure rise at pickoff 36 and a pressure drop at pickoff 34 thereby causing a pressure differential between lines 24 and 26 with the higher pressure in line 26. As it will be appreciated by those skilled in the art, other rate-sensing devices are available to sense course deviations of a vehicle. For example, rate and acceleration sensors, both angular and rectilinear, may be used, singularly or in combination.

The signal-generating system 14 includes a housing 40 having a cylindrical chamber 42 therein. A piston 44 cooperates with the wall 45 of the cylindrical chamber 42 to form a dynamic seal thereby dividing the cylindrical chamber 42 into a first chamber portion 46 and a second chamber portion 48. The piston 44 may be suitably replaced by other dynamic seals such as a diaphragm or the like. An orifice 50 in piston 44 communicates the two chamber portions each with the other. It will be appreciated that the orifice 50 may also be located in the housing 40. The signal-generating system 14 is provided with a source 52 of supply fluid communicating with chamber portions 46 and 48 through flow lines 54 and 56, respectively. A pair of output ports 58 and 60 communicate with output flow lines 62 and 64, respectively.

The orifice 50 is sized, both in diameter and length, such that the signal-generating system 14 provides output signals only in response to rates of movement of piston 44 above a predetermined rate. The size of the orifice 50 controls its flow resistance and hence the amount of pressure differential rise between chamber portions 46 and 48 occuring as a result of movements of piston 44. It will be appreciated that increasing the diameter or reducing the length of the orifice 50 decreases its flow resistance and hence increases the rate at which the piston 44 must move to create a given output signal, and vice versa. It will also be appreciated that the signal-generating system 14 is responsive to the rate of movement of piston 44 rather than the amount of movement by virtue of the orifice 50. Furthermore, by virtue of the orifice 50, signal-generating system 14 is substantially unresponsive to rates of change of course correction below a predetermined nominal rate of change.

The output flow lines 62 and 64 are connected to control ports 66 and 68, respectively, of the vortex rate sensor 12 for summing the generated signal with sensed course deviations. The control ports 66 and 68 are disposed interior of the porous element 30 and are tangentially and oppositely oriented in a manner to influence the vortical flow of fluid in the vortex rate sensor 12 in opposite directions and thereby modulate the sensor output signal according to the generated signal on lines 62 and 64.

Alternatively, the generated signal on flow lines 62 and 64 may be summed with the rate sensor output downstream of the rate sensor 12, for example, by supplying the signal to opposing control ports in a jet-on-jet device as shown in FIG. 2 in which the jet-on-jet device 80 of the response-limiting circuit 20 is provided with an additional pair of opposing control ports 70 and 72 for modulating the output signal of the rate sensor according to the generated signal on lines 64 and 62, respectively.

The piston 44 is operably connected the the driver input means for receiving driver-steering commands, for example, by a linkage 74 pivotally connected to a lever 76 which rotates with the main steering unit output shaft 78. Accordingly, the piston 44 is axially movable in cylinder 42 in response to driver-steering commands.

It will be appreciated that the rate of turning or driver course correction of the vehicle is a function of the angular position of the steering wheel. Therefore, the rate of change of turning or the rate of change of yaw rate is a function of the angular rate of the steering wheel movement. Accordingly, the movement of the lever 76 is in proportion to the rate of change of turning or rate of change of driver course correction of the vehicle. Since the lever 76 is connected to the piston 44, the movement of piston 44 in chamber 42 is in proportion to the rate of change of turning or rate of change of course driver correction of the vehicle. Hence, a fluid signal is provided by the signal-generating system 14 in response to rates of change of driver course corrections of the vehicle which are above a predetermined rate of change set by the size of the orifice 50 in piston 44.

The circuit 20 for limiting the response of the system 10 to course deviations having rates of change above a predetermined rate of change is essentially a proportional jet-on-jet device 80 adapted to cancel output signals from the sensor 12 which represent course deviations having rates of change below the predetermined rate of change. Particularly, the jet-on-jet device 80 has a supply port 82 connected to a source 84 of pressurized fluid, a first pair of control ports 86 and 88 connected directly to the output of the vortex rate sensor 12 by lines 90 and 92, a second pair of control ports 94 and 96 connected to the vortex rate sensor 12 by lines 98 and 100, respectively. Each line 90 and 92 has a restriction 101 and each line 98 and 100 has a volume or fluid capacity 102 and a restriction 104. In the case of incompressible fluids, the volumes 102 are provided with flexible diaphragms 103 which provide a space for containing a compressible medium 105 which, for example, may be air. In the case of a compressible fluid such as air, the flexible diaphragms 103 are not necessary. The restrictions 101 may be adjustable to balance the control flows of the circuit 20. The proportional jet-on-jet device 80 is also provided with a pair of output channels 106 and 108. It will be appreciated by those skilled in the art that the supply flow from supply port 82 will be diverted to the output channel 106 in response to a flow from either control port 88, control port 96, or both, and further that the supply flow will be diverted to output channel 108 in response to a flow from either control port 86, control port 94, or both. The device described herein is a proportioning device, and therefore, the amount of flow diverted to one or the other output channel depends upon the relative amount of flow from the control ports. Moreover, opposing flows from the control ports on opposite sides of the device will have a net effect which is proportional to the difference in their flows. That is to say, if the flow from control port 86 is greater than the flow from control port 88, the supply flow from supply port 82 will be diverted from output channel 108 in proportion to the difference between the flows from control ports 86 and 88. On the hand, if the flow from each of the control ports are equal, the flow to the output channels 106 and 108 will be equal and therefor the net signal from the device 80 will be zero.

It will be appreciated by those skilled in the art that signals having high rates of change will be substantially attenuated in rate by the volumes 102 since the capacities of the volumes tend to delay and flatten signals of high rate. It will further be appreciated that the attenuation in rate provided by the volumes 102 renders the signals having high rates of change passing through lines 98 and 100 relatively ineffective in diverting the supply flow in the device 80. On the other hand, the flows through lines 90 and 92 having low rates of change pass substantially unimpeded.

In practice, a transition range exists between those signals having rates of change which are substantially impeded by the restrictions 104 and the volumes 102 and those signals which are not impeded. Even though a transition range exists, this range or cutoff point may be defined appropriately as a nominal predetermined rate of change. The optimum nominal predetermined rate of change is normally set by analysis of the actual performance characteristics of the given vehicle type. Once a desired predetermined rate of change has been determined, the passage size of restriction 104 and the capacity of volume 102 may be adjusted to provide that nominal rate. For example, either an increase in the capacity of the volume 102 or a decrease in the passage size of restriction 104 will lower the predetermined rate of change, and vise versa.

Considering now a fluid signal on lines 24 and 26 representative of course deviations having rates of change below the predetermined rate of change, i.e., due to normal driver commands, it will be appreciated that the signal will be substantially unimpeded by the volumes 102 in lines 98 and 100, as explained above. Since the same signal passes unimpeded through the lines 90 and 92, equal signals will be placed in opposition in the device 80 such that the net output from the device 80 will be zero. Considering now a fluid signal on lines 24 and 26 representative of course deviations having rates of change above the predetermined rate, it will be appreciated that the signal will be impeded by the volumes 102 and thereby rendered ineffective in lines 98 and 100. However, the signal will pass unimpeded on lines 90 and 92 to the device 80. Accordingly, the device 80 will respond to the signals on lines 90 and 92 thereby providing output signals in output channels 106 and 108 which is representative of course deviations having rates of change above the predetermined rate of change.

For reasons which will be apparent in view of the discussion of the operation of the system 10 which appears below, it is often desirable to preset the aforementioned predetermined rate of change of the response-limiting circuit 20 to be substantially equal to the aforementioned predetermined rate of change of the signal-generating system 14 since the effects of each are mutually cooperative in distinguishing course deviations due to driver-steering corrections from course deviations due to lateral disturbances. Particularly, it has been discovered that typical driver-steering commands provide course deviations at rates of change below the predetermined rate whereas most lateral disturbances create course deviations at rates of change above the predetermined rate. Therefore, the response-limiting circuit 20 nominally distinguishes between the two types of course deviations. However, some driver course corrections will occur at rates of change above the predetermined rate, for example, course corrections arising out of emergency situations. It will then be appreciated that the response-limiting circuit 20 will not distinguish those course deviations from course deviations due to lateral disturbances. However, the signal-generating system 14 does adequately distinguish these types of course corrections. This is accomplished by canceling rate sensor outputs due to course deviations derived from high rate of change driver-steering commands. Accordingly, the system according to this invention responds substantially only to those course deviations which are due to lateral disturbances regardless of the rate of course correction by the vehicle operator.

It will be appreciated that the signal-generating system 14 generally provides a short duration signal and therefore is ideally suited for compensating for high rate of change, short duration, steering commands encountered in typical emergency situations. Signal durations may be adjusted by appropriate linkages which control the excursion of the piston 44 in the cylinder 42.

The amplifying circuit 16 comprises a fluidic amplifier 110 and a pair of variable restrictions 112. It will be appreciated that the variable restrictions 112 may be used to adjust the gain of the signal passing therethrough, for example, to tailor the system 10 to suit the characteristics of individual vehicles.

The fluidic amplifier 110 is a jet-on-jet proportional device having a supply port 114 connected to a source 116 of pressurized fluid, a pair of control ports 118 and 120, a pair of feedback ports 122 and 124, and a pair of output channels 126 and 128 connected to output lines 130 and 132. Although only a single amplifier is shown, it will be understood that a series of amplifiers may be used. It will be appreciated that the output signal on output channels 130 and 132 is an amplified signal which is representative of the control signal flow through control ports 118 and 120 and a feedback flow through the feedback ports 122 and 124. To facilitate the teaching of the present invention, the feedback system will be considered inoperative at the present time. It is understood then that the net output from the response-limiting circuit 20 is amplified by the amplifying circuit 110 to provide an amplified output signal on flow lines 130 and 132 which is representative of course corrections required to compensate for course deviations due to lateral disturbances sensed by vortex rate sensor 12.

The limited authority actuator 18 is adapted to be interposed in the vehicle main steering system, for example, as shown in FIG. 4, to provide steering corrections supplemental to the operator-steering commands. The actuator 18 (FIG. 1) comprises a spool valve 134, an actuator output portion 136 and a feedback system 138.

The spool valve 134 comprises a housing 140 and a spool 142 being axially movable therein in response to fluid signals on amplifier circuit output lines 130 and 132. A source 144 of pressurized supply fluid communicates with a central supply chamber 146 formed by the housing 140. The spool 142 is provided with lands 148, 149 and 150 cooperating with the walls of housing 140. A pair of annular return chambers 152 and 154 are formed in the housing 140 having return passages 157 and 159, respectively, communicating therewith. For example, the return passage may be connected to a supply reservoir by flow lines (not shown). The housing 140 is further provided with a pair of output passages 156 and 158 having openings between the return chambers and the supply chambers. Spool valves of this construction are well known in the art and therefore only a brief description of the operation of the spool valve 134 will follow. Assuming that the fluid flows and consequently the pressures in the lines 130 and 132 are equal, the spool 142 will be balanced in a central position thereby positioning the spool lands 148, 149 and 150 to prevent any substantial flow between the output passages 156 and 158, and either the supply chamber 146 or the return chambers 152 and 154. If, however, there is a differential flow between the lines 130 and 132 because the course of the vehicle has been laterally disturbed, a differential pressure is established across the spool 142 which causes it to move in one direction, communicating one of the output passages 156 or 158 to the supply chamber 146 thereby allowing flow from the source 144 of supply fluid to the selected one of the output passages 156 or 158. Moreover, the above movement of the spool 142 communicates the other of the output passages to the corresponding return passages 157 or 159.

The output passages 156, and 158 of spool valve 134 communicate with the actuator output portion 136 which comprises a housing 160 and a rotatable member 162 therein fixedly connected to the actuator output shaft 164. As shown in FIG. 1, the circular sides of the rotatable member 162 cooperate with the walls of the housing 160 to form a substantial fluid seal therewith. The operating relationship of the housing 160, the rotatable member 162 and the actuator output shaft 164 may be more easily seen in the exploded view of these components in FIG. 3.

The actuator output portion 136 responds to fluid signals from passages 156 and 158. Particularly, the housing 160 is provided with a pair of ports 166 and 168, connected by a passage not shown, communicating with the spool valve output passage 156 and is further provided with a pair of ports 170 and 172, also connected by a passage not shown, communicating with the spool valve output passage 158. As can be seen in FIG. 1, a pressure in the line 156 causes a corresponding pressure against the sides 174 and 176 of the rotatable member 162 causing clockwise rotation of that member whereas a pressure in the line 158 causes a pressure against the sides 178 and 180 of the rotatable member 162 causing counterclockwise rotation. The rotation of the rotatable member 162 causes corresponding rotation of the actuator output shaft 164.

In FIG. 1, it can be seen that the rotatable member 162 is provided with an integral extension 182, and a pair of flow nozzles 184 and 186 positioned on opposite sides of the extension 182. The nozzles 184 and 186 communicate with a source 188 of pressurized fluid through a pair of restrictions 190 and 192, respectively. The housing 160 is provided with a return passage 193 for egress of fluid from the nozzles 184 and 186. The return passage 193 may be connected to a supply reservoir. It will be appreciated that the rotation of the rotatable member 162, and the consequent movement of the extension 182 with respect to the nozzles 184 and 186, causes a variation in the pressure immediately upstream of the nozzles 184 and 186 due to a variation in the flow restriction at the nozzle. The pressure immediately upstream of the nozzles 184 and 186 is transmitted to the lines 194 and 196, respectively, thereby causing a variable rate of fluid flow through these lines .rom the source 188 which is representative of the position of extension 182, and accordingly, the position of the actuator output shaft 164. The flow signals in the lines 194 and 196 communicate with the feedback ports 124 and 122, respectively, of the proportional amplifying device 110.

As can be seen in FIGS. 3—5, the housing 160 of the limited authority actuator 18 is connected to the output shaft 78 of the main steering unit 198 for rotation therewith. It will be appreciated then that the housing 160 rotates in response to driver-steering commands. It can also be seen in FIGS. 1 and 3 that the rotatable member 162 and consequently the actuator output shaft 164 are allowed limited rotary movement with respect to housing 160 by virtue of their configuration. Therefore, the actuator output shaft 164 rotates with the output shaft 78 of the main steering unit 198 with the exception of any relative rotation between the housing 160 and the rotatable member 162.

The actuator output shaft 164 is connected to the dirigible wheels for turning of the vehicle as seen with reference to FIG. 4 in which a steering system for a land vehicle is shown having a steering wheel 200 for control of the vehicle by the operator, and a steering shaft 202 connecting the steering wheel 200 with a main steering unit 198. Operator commands are transmitted through the main steering unit 198 to the main steering output shaft 78, and in turn, to the limited authority actuator housing 160. The limited authority actuator output shaft 164 is connected to a Pitman arm 204 for rotation thereof. The Pitman arm 204 is connected to the dirigible wheels 212 (one not shown for clarity) by a suitable known steering linkage 208 for turning of the dirigible wheels 212 about the pivotal axes of the uprights 214 and consequent steering of the vehicle. Although this invention is described with respect to a conventional steering apparatus for an automobile, it will be appreciated it can be equally applied to other methods for steering land vehicles.

FIG. 5 illustrates in detail the portion of the steering system of FIG. 4 having the signal-generating system 14. In FIG. 5, the housing 40 of the signal-generating system 14 is shown mounted on the main steering box 198. The lever arm 76 is also shown connected to the main steering unit output shaft 78 an in turn connected to the piston 44 (FIG. 1) inside of housing 40 by a linkage 74 (FIG. 5). The main steering unit output shaft 78 rotates in response to driver-steering commands on the steering shaft 202 and accordingly moves piston 44 within housing 40 in response to driver-steering commands.

In view of the above, it will be appreciated that dirver-steering commands are transmitted from the main steering unit output shaft 78 through the limited authority actuator 18 to the dirigible wheels 212. However, the limited relative rotation provided between actuator output shaft 164 and the housing 160 permits the introduction of lateral disturbance steering corrections. This relative rotation between the actuator output shaft 164 and the housing 160 is not transmitted back to the vehicle operator to any degree because of the low compliance of the steering train in the reverse direction. It will thus be appreciated that the dirigible wheels are steered by the sum of the operator-steering commands and the course correction signals provided by automatic lateral disturbance compensating system 10. It will be appreciated that the operator has a wide range of authority over vehicle steering whereas the lateral disturbance compensating system 10 has a substantially more limited authority by virtue of the configuration of rotatable member 162 and the actuator housing 160. However, the limited authority of the compensating system 10 is sufficient to correct course deviations due to lateral disturbances. By virtue of the limited authority of the lateral disturbances compensating system 10, erroneous steering corrections die to malfunctions of the system are easily overriden by operator-steering commands.

As still an additional advantage to the steering system according to this invention, a mechanical link is provided between the steering wheel 200 and the dirigible wheels 212 in the event that the automatic compensating system 10 fails. Particularly, it will be appreciated that the maximum relative rotary movement between the actuator output shaft 164 and the main steering system output shaft 78 is limited to only a few degrees by the configuration of the actuator housing 160. When the relative movement between the two shafts reaches its maximum limit in either direction, the rotatable member 162 abuts against the actuator housing 160 thereby mechanically linking the shafts 78 and 164. Accordingly, a mechanical link is provided between the steering wheel 200 and the dirigible wheels 212 in the event of the failure of the lateral disturbance compensating system 10.

To facilitate the teaching of the operation of this invention, consider the case where a vehicle equipped with the lateral disturbance compensating system 10 is proceeding on a straight course and does not encounter a lateral disturbance. Since the vehicle is being steered on a straight course, the piston 44 remains stationary and therefore, there is no output from the signal-generating system 14. Also, since the vehicle is proceeding on a straight course, and consequently there is no course deviation, the output signal from the vortex rate sensor 12 will be zero and hence the flows through lines 24 and 26 will be equal and constant, i.e., a zero rate of change. Since the rate of change of the signals on lines 24 and 26 is zero, equal signals will reach the device 80 through lines 90 and 92 and through lines 98 and 100. Accordingly, the signals will cancel each other in the device 80, and therefore, the output from the response-limiting circuit 20 will be zero. Hence, the remainder of the system will receive a zero signal and therefore the output shaft 164 of the actuator 18 will remain stationary. It will be appreciated then that the lateral disturbance compensating system 10 will have no effect on vehicle steering. This, of course, is the desired result since the vehicle had not encountered a lateral disturbance.

Next, consider the case where the vehicle is proceeding on a straight course and encounters a lateral disturbance such as a wind gust or a road irregularity. Again there has been no driver-steering command and accordingly there is no output signal from the signal-generating system 14. However, the lateral disturbance will cause a course deviation of the vehicle or yaw motion of the vehicle which will be sensed by the vortex rate sensor 12. In response to the yaw motion, an output signal on lines 24 and 26 of the vortex rate sensor 12 will be provided which is representative of the direction of the yaw motion and the yaw rate. The direction of yaw motion is represented by the fluid line, 24 or 26, which contains the highest flow rate whereas the amount of yaw rate is represented by the differential rates of flow in fluid lines 24 and 26. Since the deviation has been caused by a lateral disturbance, the rate of change of course deviation will be above the predetermined rate at which the response-limiting system 20 has been preset. Accordingly, the signal on lines 24 and 26 from the vortex rate sensor 12 will be impeded in lines 98 and 100 by the volumes 102. On the other hand, the signal will pass unimpeded on lines 90 and 92. Therefore, as explained previously, the proportional jet-on-jet device 80 will respond to the output signal of the vortex rate sensor on lines 90 and 92 and provide a signal corresponding thereto on its output channels 106 and 108. In turn, the signal from the device 80 will be amplified by the amplifying circuit 110 and transmitted to the limited authority actuator 18. The signal is essentially a difference in flow rates between lines 130 and 132. This difference in flow rates is applied to opposite ends of the spool 108 thereby creating differential pressure across the spool 142 and a corresponding movement of the spool towards the side of lower pressure. This movement exposes the selected one of the output passages 156 or 158 to the supply pressure in the inlet chamber 146 causing flow into the selected passage from the source 144. Flow into these fluid passages, as explained above, rotates the output shaft 164 in a preselected direction to provide steering of the vehicle according to the course correction signal on lines 130 and 132, and hence, corrective steering which compensates for the lateral disturbance.

It can be seen from FIG. 1 that the extension 182 moves with the shaft 164 to provide a flow differential between flow lines 194 and 196 corresponding to the amount of actual steering correction. A flow differential in the lines 194 and 196 is applied to the amplifier circuit 110 as a feedback signal. It will be appreciated that the feedback signal opposes the input signal to the amplifier circuit 110 in proportion to the actual movement of the actuator output shaft 164 thereby providing accurate position control of the output shaft 164. Furthermore, the feedback signal serves to return the actuator output shaft 164 to the neutral position when no correction signal is received by the amplifier circuit 110.

Consider now the case in which the vehicle negotiates a normal driver-induced turn (i.e., a turn having a low rate of change) and the vehicle does not encounter a lateral disturbance. Since a vehicle is negotiating a turn, it will experience a yaw rate. The vortex rate sensor 12 will sense the yaw rate and provide an output signal on lines 24 and 26 which is representative thereof. Since the vehicle is undergoing a normal driver-induced turn, the rate of change of course deviation will be below the predetermined rate of change at which both the signal-generating circuit 20 have been preset. Accordingly, the signal-generating circuit 14 will provide a zero output signal. In addition, the signal on lines 24 and 26 from the vortex rate sensor 12 will be unimpeded by the volumes 102 and they will oppose substantially the same signal which is on lines 90 and 92 at the device 80. Hence, the signals will be cancelled and the output from the device 80 on output channels 106 and 108 will be zero. Since the signal transmitted to the remainder of the system is zero, the lateral disturbance compensating system 10 will not provide a steering correction. It will then be appreciated that in the case of a normal driver-induced turn without a lateral disturbance, the lateral disturbance compensating system 10 will have no effect on the steering of the vehicle.

Consider now the case where the vehicle negotiates a typical driver-induced turn and encounters a lateral disturbance. It will be appreciated that there will be a course deviation of the vehicle due to the lateral disturbance, and in addition, there will be a course deviation due to the driver-induced turning of the vehicle. These two components of course deviation may either add or subtract to provide a net course deviation. The vortex rate sensor 12 will provide an output signal on the output lines 24 and 26 which is representative of the net course deviation of the vehicle. Therefore, the output signal from the vortex rate sensor 12 can be considered to have two components, a component representative of the course deviation due to the driver-steering command and a component representative of the course deviation due to the lateral disturbance. In this regard, the signal-generating system 14 will have no significant effect on the rate sensor output since the driver-induced turn has a low rate of change.

As stated previously, the course deviation due to the lateral disturbance will be at a rate higher than the predetermined rate at which the response-limiting circuit 20 is preset whereas the course deviation due to the normal driver-steering command will be at a rate below the predetermined rate. By virtue of this relationship, the two components of the output signal from the vortex rate sensor 12 may be considered to be a signal of high frequency superimposed on a signal of low frequency. The system of the present invention distinguishes the two signals through frequency (i.e., rate of change) discrimination, accomplished by the response-limiting circuit 20. As explained previously, signals from the vortex rate sensor 12 on lines 24 and 26 which are representative of low rates of change are cancelled by the jet-on-jet device 80 whereas signals representative of high rates of change are effective in diverting the fluid flow in the device 80 such that output signal from the device 80 is only representative of vortex rate sensor output signals having high rates of change. This operational distinction between signals having high or low rates of change persists even though the signals are mixed. Therefore, the component representative of the course deviation of the vehicle due to the lateral disturbance is the sole component represented in the output of the device 80. The output of the proportional jet-on-jet device 80 is then transmitted to the remainder of the system 10 to provide corrective steering of the vehicle.

Considering now the operation of the lateral disturbance compensating system 10 in the event of an emergency steering command (i.e., a steering command having a rate of change above the predetermined rate of change), it will be appreciated that the movement of piston 44 will be sufficiently rapid so as to create a pressure differential between chamber portions 46 and 48 which is not immediately relieved by the restrictive flow passage 50. This pressure differential is transmitted to the vortex rate sensor 12 by flow lines 62 and 64 in a manner so as to influence the vortical flow therein and accordingly, so as to modulate the output signal from the vortex rate sensor 12 on lines 24 and 26 according to the rate of change of driver-steering commands. Particularly, the movement of piston 44 will provide a tangential jet or pulse of fluid in the rate sensor 12 which opposes vortical flow induced by the turning of the vehicle due to the emergency driver-steering command. In this manner, turning induced vortical flows due to emergency steering commands are substantially cancelled, and accordingly, the lateral disturbance compensating system 10 does not provide steering corrections for the emergency driver-steering commands. Therefore, the emergency driver-steering commands are not nullified by the system, hence providing the driver with full authority over the vehicle in the event of an emergency.

In view of the above description, it will be appreciated that the present invention provides a low-cost and reliable fluidic lateral disturbance compensating system. It also provides increased safety over the steering systems of the prior art, and in addition, is more refined in operation since it effectively distinguishes between course deviations due to lateral disturbances and course deviations due to driver-steering commands. All of the fluidic components described herein are particularly adapted for efficient incorporation into a system suitable for automotive use. In addition, this system may be used with a variety of actuators and therefore can be conveniently incorporated with existing steering system designs.

While I have described preferred embodiments of the present invention, it should be understood that various changes, adaptations and modifications may be made therein without departing from the spirit of the invention and the scope of the appending claims.

I claim:

1. A land vehicle steering system which automatically compensates for lateral disturbances comprising:
   means for steering said vehicle in response to operator commands;
   a sensor mounted on said vehicle and adapted to provide a sensor signal representative of course deviations of said land vehicle;
   means for modulating said sensor signal according to the rate of change of said operator commands; and
   means to effect the steering of said vehicle in response to said modulated sensor signal.

2. The steering system of claim 1 wherein said modulating means includes means modulating said sensor signal only according to rates of change of operator commands above a nominal predetermined rate of change.

3. The steering system of claim 1 wherein said sensor is a vortex rate sensor mounted on said vehicle to sense yaw rate of said vehicle.

4. The steering system of claim 3 wherein said modulating means comprises control port means for said vortex rate sensor for influencing an output flow therefrom according to rates of change of said operator commands.

5. The steering system of claim 4 wherein said control port means comprises a pair of control ports being tangentially oriented in opposite directions interior of said vortex rate sensor for influencing the flow therein in opposite rotational directions in accordance with the direction of said operator commands.

6. The steering system of claim 1 wherein said modulating means comprises:
   means responsive to said operator commands for providing a generated output signal representative of rates of change of said operator commands; and
   summing means associated with said sensor and said last means for providing said modulated signal.

7. The steering system of claim 6 wherein said summing means includes a separate device operatively associated with both said sensor and said means responsive to rates of change of said operator commands for receiving signals therefrom and providing said sum.

8. The steering system of claim 6 wherein said means providing a generated output signal representative of rates of change of said operator commands comprises:
   a housing;
   dynamic seal means for movement in response to said operator commands cooperating with said housing to form a chamber for receiving a fluid;
   orifice means communicating with said chamber for providing restricted flow of said chamber fluid therethrough upon movement of said dynamic seal means; and
   output means communicating with said chamber for supplying said generated signal to said summing means.

9. The steering system of claim 8 wherein:
   said dynamic seal means forms two chambers;
   said orifice means communicates the two chambers, each with the other; and
   said output means is a pair of flow passages, each communicating with the pressure in one of said chambers, for supplying said generated signal to said summing means.

10. A land vehicle steering system which automatically compensates for lateral disturbances comprising:
    means for steering said vehicle in response to operator commands;
    a fluidic sensor mounted on said vehicle and adapted to provide a fluid sensor signal representative of course deviations of said land vehicle;
    means for modulating said sensor signal according to the rate of change of said operator commands;
    fluidic amplifier means for providing an amplified fluid signal representative of said sum; and
    means to effect the steering of said vehicle in response to said amplified fluid signal.

11. The steering system of claim 10 wherein said modulating means modulates said sensor signal only according to rates of change of operator commands above a nominal predetermined rate of change.

12. The steering system of claim 10 wherein said sensor is a vortex rate sensor mounted on said vehicle to sense yaw rate of said vehicle.

13. The steering system of claim 12 wherein said modulating means comprises control port means for said vortex rate sensor for influencing an output flow therefrom according to rates of change of said operator commands.

14. The steering system of claim 13 wherein said control port means comprises a pair of control ports being tangentially oriented in opposite directions interior of said vortex rate sensor for influencing the flow therein in opposite rotational directions in accordance with the direction of said operator commands.

15. The steering system of claim 10 wherein said modulating means comprises:
    means responsive to said operator commands for providing a generated fluid output signal representative of rates of change of said operator commands; and
    summing means associated with said sensor and said last means for providing said modulated signal.

16. The steering system of claim 15 wherein said summing means includes a separate fluidic device operatively associated with both said sensor and said means responsive to rates of change of said operator commands for receiving signals therefrom and providing said sum.

17. The steering system of claim 15 wherein said means providing a generated fluid output signal representative of rates of change of said operator commands comprises:
    a housing;
    dynamic seal means for movement in response to said operator commands cooperating with said housing to form a chamber for receiving a fluid;
    orifice means communicating with said chamber for providing restricted flow of said chamber fluid therethrough upon movement of said dynamic seal means; and
    output means communicating with said chamber for supplying said generated signal to said summing means.

18. The steering system of claim 17 wherein:
    said dynamic seal means forms two chambers;
    said orifice means communicates the two chambers, each with the other; and
    said output means is a pair of flow passages, each communicating with the pressure in one of said chambers, for supplying said generated signal to said summing means.

19. A land vehicle steering system which automatically compensates for lateral disturbances comprising:
    means for steering said vehicle in response to operator commands;
    a fluidic sensor mounted on said vehicle and adapted to provide a sensor signal representative of course deviations of said land vehicle;
    means for modulating said sensor signal according to the rate of change of operator commands having rates of change above a nominal predetermined rate of change;
    means for limiting the response of said system to sensor signals representative of course deviations having rates of change above said nominal predetermined rate of change; and
    means for effecting the steering of said land vehicle according to said modulated sensor signals to which said system responds.

20. The steering system of claim 19 wherein said sensor is a vortex rate sensor mounted on said vehicle to sense yaw rate of said vehicle.

21. The steering system of claim 20 wherein said modulating means comprises control port means for said vortex rate sensor for influencing an output flow therefrom according to rates of change of said operator commands having rates of change above a nominal predetermined rate of change.

22. The steering system of claim 21 wherein said control port means comprises a pair of control ports being tangentially oriented in opposite directions interior of said vortex rate sensor for influencing the flow therein in opposite rotational directions in accordance with the direction of said operator commands having rates of change above a nominal predetermined rate of change.

23. The steering system of claim 19 wherein said modulating means comprises:
means responsive to said operator commands for providing a generated output signal representative of rates of change of said operator commands; and
summing means associated with said sensor and said last means for providing said modulated signal.

24. The steering system of claim 23 wherein said summing means includes a separate device operatively associated with both said sensor and said means responsive to rates of change of said operator commands for receiving signals therefrom and providing said sum.

25. The steering system of claim 23 wherein said means providing a generated output signal representative of rates of change of said operator commands comprises:
a housing;
dynamic seal means for movement in response to said operator commands cooperating with said housing to form a chamber for receiving a fluid;
orifice means communicating with said chamber for providing restricted flow of said chamber fluid therethrough upon movement of said dynamic seal means; and
output means communicating with said chamber for supplying said generated signal to said summing means.

26. The steering system of claim 25 wherein:
said dynamic seal means forms two chambers;
said orifice means communicates the two chambers, each with the other; and
said output means is a pair of flow passages, each communicating with the pressure in one of said chambers, for supplying said generated signal to said summing means.